United States Patent Office 3,158,465
Patented Nov. 24, 1964

3,158,465
METALLURGICAL MATERIAL AND PROCESS FOR TREATING IRON THEREWITH
William A. Brown, Rector, Pa., and John F. Drenning, Birmingham, Ala., assignors to Kerchner, Marshall & Company, Pittsburgh, Pa., a corporation of Pennsylvania
No Drawing. Filed Sept. 7, 1961, Ser. No. 136,446
3 Claims. (Cl. 75—57)

This invention relates to a metallurgical material and a process for treating cupola or ladle iron therewith in order to improve the properties of the iron. The invention further relates, and more particularly, to a novel metallurgical briquette which is more durable by reason of having improved wet and dry strength and is functionally improved by promoting faster deoxidation of the iron and removal of infusible silica therein in the form of silicates.

The present invention, is related to U.S. Patent No. 3,051,564, issued to John F. Drenning, which discloses generally, an improved metallurgical briquette which realizes more efficient usage of silicon carbide by inclusion of preferred quantities of sodium carbonate or other alkaline agent to speed up solution and dispersion of the silicon carbide throughout the molten iron and to remove silica from said molten iron as sodium silicate. The carbon and silicon of the silicon carbide deoxidize the molten iron and thereby improve its properties.

It has been found that when sodium carbonate is present in the briquette in amounts of the order of 10% by weight of the briquette, there is sufficient alkaline salt present to serve as a catalyst for the silicon carbide effecting its more efficient usage and also to remove silica derived from the silicon carbide as sodium silicate; but, the briquette also becomes weak and friable when the alkaline salt is present in this amount and the briquette possesses insufficient internal strength both in wet and dry conditions. This means that the briquette cannot be stored for any length of time without deteriorating and simply falling apart.

It has been further found that a briquette having sodium carbonate, in the range of 10% by weight of the briquette, is excessively hygroscopic and the briquette will therefore tend to "pickup" moisture from the air or surrounding bodies thus promoting further deterioration of the briquette.

It is one of the objects of the present invention to provide a novel briquette composition in which the alkaline salt material is partially substituted by a neutral salt material which will react complementarily with the alkaline salt in order to achieve all of the advantages of a high concentration of alkaline salt catalytic action and at the same time correct certain shortcomings of a high alkaline salt concentration briquette.

It forms an important part of the present invention that a neutral salt has been discovered which can substitute in part for the alkaline salt material and is the full equivalent thereof when substituted in proper amount, so that equivalent functional results of the pure alkaline salt are retained, but the disadvantages of non-coherence of the briquette are eliminated as well as its previous objectionable tendency to absorb moisture.

This discovery is contraindicated in the art because the neutral sodium chloride salt used is normally considered to be quite hygroscopic and is not at all notable as a material having strength or natural coherence. Nevertheless, in spite of the doubts of those skilled in this art, experimental results clearly indicate that a neutral salt such as sodium chloride can partially substitute for the alkaline salt material (sodium carbonate) and none of the functional advantages are compromised as to catalytic dispersing action on the silicon carbide, nor are any of the advantages of a pure alkaline salt usage lost. But the effect of including the sodium chloride as a partial replacement, is to totally eliminate serious prior disadvantages in the briquette of inadequate wet and dry strength, and also to eliminate the objectionable hygroscopic tendency of the briquette.

Other objects and advantages of the invention will become apparent from a more detailed description of the invention which proceeds with reference to certain selected example embodiments which are intended to be illustrative of the invention but are in no sense restrictive thereof.

It has now become standard in casting practice, to use additions of silicon carbide to cupola or ladle iron in order to improve the properties of the iron casting. It was thereafter proposed in the aforesaid U.S. Patent No. 3,051,564 that sodium carbonate or its equivalent alkaline salt could be combined with silicon carbide, and such a combination would improve the carbide acting as a deoxidizing agent, this being evident from the fact that 40 to 45 points of residual silicon were absorbed per 1% briquette addition, based on the weight of metal added to the cupola, as compared with 20 to 25 points per 1% briquette addition, based on the weight of the metal added to the cupola but without the alkaline salt material.

Sodium carbonate is not the only alkaline material which can be used for the purpose of increasing the effectiveness of the silicon carbide. There has been used with satisfactory result, such other materials as lye, sodium bicarbonate, sodium oxide, potassium carbonate and lithia. Other equivalent materials are also suitable.

These materials, silicon carbide, sodium carbonate, sodium chloride, are all generally used in subdivided particle form. The relative proportions of the materials used amount, typically, to about 10 parts by weight of alkaline agent for each 100 parts by weight of pure silicon carbide, the sodium chloride being a partial substitute for the silicon carbide. What determines the amount of salt material (alkaline and neutral) at its upper limit is the tendency for it to combine with certain of the silicates forming the liner of the cupola. For that reason, we generally establish an optimum upper limit of sodium carbonate-sodium chloride to silicon carbide ratio added to the cupola or to the ladle. Since it is the silicon carbide which is the active reagent in improving the property of the casting then no important advantages are obtained by increasing the concentration of alkali salt beyond that necessary to achieve maximum efficiency of the silicon carbide.

It will be seen that silicon carbide when dissociated and dispersed throughout the molten iron, tends to produce a slag and the silicon generated from dissociation of the silicon carbide must be removed in the most convenient manner without injurious result to the cupola lining. This can be done by combining the silicon, which is converted to silica, with sodium iron and forming a sodium silicate. This can be done effectively only when silica is produced in sufficiently small quantity. Best results are obtained when the alkaline salt material is about 10% by weight of the briquette.

An example of the previously used Drenning composition is a follows:

|  | Parts | Percent |
|---|---|---|
| Sodium carbonate | 15 | 9.8 |
| Portland cement | 16.5 | 10.9 |
| Vermiculite | 1.5 | 0.9 |
| Silicon carbide, metallurgical grade (approximately 84% SiC) | 119 | 78.4 |

A briquette having this proportion of sodium carbonate to silicon carbide will be dispersed quickly and efficiently throughout molten iron metal to effect improvement thereof. Functionally, it is quite good but it will deteriorate at such a rate that it cannot be stored for any satisfactory period without eventually crumbling of its own weight. Also, a briquette of this composition has a hygroscopic tendency making it absorb water in the atmosphere or from any surrounding body which tends further to weaken it and so it cannot be safely handled for charging the cupola. As a result of both of these disadvantages, it has been necessary to decrease the amount of sodium carbonate to about 5%–8% by weight of the silicon carbide whereupon, the efficiency of the silicon carbide is reduced when the material is so modified.

In the present invention, we have discovered, that by adding sodium chloride or its equivalent material to the sodium carbonate, the two materials will work complementarily so that the proportion of 10% sodium salt of the total weight of briquette can be maintained for maximum efficiency of the silicon carbide and at the same time the normally weakened condition of the briquette is eliminated. Also, the objectionable hygroscopic property of the briquette is substantially eliminated. As explained in U.S. Patent No. 3,051,564, the vermiculite material which is included in small amounts, is for the purpose of exfoliating and thereby shattering the briquette in order to bring the silicon carbide material even more quickly into contact with the molten iron. A specific example of the invention is one in which the sodium carbonate is about 40% substituted by sodium chloride. Thus, the foregoing Drenning composition is modified to be:

*Example I*

|  | Parts | Percent |
| --- | --- | --- |
| Sodium carbonate } Sodium salt | 9 | 5.9 |
| Sodium chloride | 6 | 3.9 |
| Portland cement | 16.5 | 10.9 |
| Vermiculite | 1.5 | 0.9 |
| Silicon carbide, metallurgical grade (approximately 84% SiC) | 119 | 78.4 |

The procedure for making the briquette in the present invention is not changed from that described in U.S. Patent No. 3,051,564 because of the addition of sodium chloride, i.e., the mixture is mixed with water and the briquette then sets to a dense, hard, weather-resistant product which will undergo the usual handling and storage but without crumbling.

Another example of a briquette which is made in accordance with the present invention and which represents a concentration of sodium salt of a greater amount, is as follows:

*Example II*

|  | Percent |
| --- | --- |
| Sodium carbonate } Sodium salt | 7.8 |
| Sodium chloride | 5.2 |
| Portland cement | 11 |
| Vermiculite | 0.5 |
| Silicon carbide, metallurgical grade (approximately 86% SiC) | 75.5 |

In this example, the ratio of sodium salt to silicon carbide is about 1:6.

While there is no upper limit of alkaline salt-sodium chloride combination in a critical sense, it should be borne in mind that the silicon carbide is the essential ingredient to improving the molten iron and the sodium salt is ancillary thereto. Hence, increasing the amount of sodium salt above about 15% by weight of the briquette (dry basis) fails to produce a corresponding functional improvement and indeed, adds somewhat to the corrosive effect of the material on the silicates forming the coupola walls.

Although the invention is used with materials in briquette form, this is not the only form in which the invention can be used and it is intended that other means for introducing the materials into the molten iron are also within the scope of the present invention. Such other means include the provision of an exterior lamination which surrounds the silicon carbide-sodium salt combination and is destroyed to release the materials within the molten ferrous bath once the materials are introduced into the melting furnace, ladle, holding furnace, electric furnace, etc.

Another example of the invention using approximately a ratio of 1:8 for sodium salt to silicon carbide is as follows:

*Example III*

|  | Percent |
| --- | --- |
| Sodium carbonate } Sodium salt | 6 |
| Sodium chloride | 4 |
| Portland cement | 11 |
| Vermiculite | 1 |
| Silicon carbide, metallurgical grade (approximately 83% SiC) | 78 |

A further example of the invention is:

|  | Parts | Percent |
| --- | --- | --- |
| Sodium carbonate } Sodium salt | 3.9 | 4.2 |
| Sodium chloride | 2.5 | 2.7 |
| Portland cement | 10.5 | 10.8 |
| Vermiculite | 1 | 1.0 |
| Silicon carbide, metallurgical grade (approximately 82% pure SiC) | 79 | 81.4 |

The addition of sodium chloride to the briquette as a partial replacement for the sodium carbonate accomplishes the previously described improved results of reducing the hygroscopic nature of the briquette, while retaining all of the functional advantages of a substantially pure alkaline salt; but, there appears to be no readily available explanation as to why these results are obtained. Sodium chloride is normally considered by those skilled in the art itself to be a hygroscopic material and is also considered to be relatively frangible. Why such material when added to sodium carbonate and combined with the other materials forming the briquette will render the material more dense, and improve its wet and dry strength, as well as functioning as the equivalent of the sodium carbonate in dispersing the silicon carbide in the molten iron, is not completely understandable to us. Nevertheless, extensive testing of briquettes substantiates without doubt these improved results. We constructed, for example, two briquettes each formed in exactly the same manner, i.e., with Portland cement binder, silicon carbide, and sodium carbonate, and after having processed them identically, formed them into a briquette. The two materials differed only in that the sodium salt in one case comprises 100% sodium carbonate and in the other case was replaced 40% by sodium chloride. The two briquettes, however, after normal aging under environments which are usual in foundry practice, exhibited remarkably different wet and dry strengths.

The pure sodium carbonate briquette was observed to be in a crumbled condition and could not withstand usual handling procedures. The pure sodium carbonate briquette was frangible, it had absorbed a considerable amount of water owing to its hygroscopic nature, and could not be handled without fracturing the briquette. In contrast with this, the same briquette, but differing in composition by 40% replacement of the sodium carbonate with sodium chloride, exhibited none of these properties of frangibility, and could be handled without breaking. In one test, the improved briquette could be dropped from about 10 feet onto a paved surface without breaking the briquette. After storing our improved briquette for about four to six months without any of the precautions which are prescribed for hygroscopic materials, it was found that the briquette had not absorbed water to any substantial degree and was certainly non-hygroscopic by a direct comparison with its parallel non-sodium chloride test material.

In use, the briquette is added to the cupola iron in the same manner and in substantially the same amounts as followed in previous practice. That is, the briquette forms about 1% to 2% by weight of the molten iron which it treats and there is no loss of the effectiveness of the briquette when it is modified by the addition of the sodium chloride. The briquette can also be employed as an addition to the molten iron in the ladle as well as the cupola, whichever is the most convenient.

The sodium chloride has, of course, other salt equivalents which can be used such as potassium salts of chloride and bromide ions and mixtures of these salts are also usable. The selection of sodium chloride is made on the basis of its inexpensive nature and not because of any considerations of criticality or exclusivity. Also, the salt which it replaces can differ. The sodium salt can replace sodium bicarbonate, potassium carbonate, lithia, and other such similar materials.

While the present invention has been described in connection with certain selected embodiments of the invention, it will be understood that these are examples of the invention. It is reasonably presumed, that those skilled in the art, to which this invention pertains, can make numerous revisions and adaptations of the invention to suit requirements. It is intended that such revisions and adaptations of the invention which are based on the herein disclosed principles, will be included within the scope of the following claims as equivalents of the invention.

We claim as our invention:

1. A briquette that is useful for treating molten iron by addition thereto, comprising a major portion of silicon carbide and up to 15% by weight of an alkaline modifying agent containing a hygroscopic material, up to 40% by weight of the modifying agent comprising sodium chloride, the lower limit of the modifying agent in the briquette being an amount effective to enhance the action of the silicon carbide in the molten iron, and the lower limit of sodium chloride in the modifying agent being an amount effective to counteract the hygroscopic characteristics of said material.

2. A briquette that is useful for treating molten iron by addition thereto, comprising a major portion of silicon carbide and up to 15% by weight of an alkaline modifying agent, the alkaline modifying agent comprising sodium carbonate and up to 40% by weight of the modifying agent of sodium chloride, the lower limit of the modifying agent in the briquette being an amount effective to enhance the action of the silicon carbide in the molten iron, and the lower limit of sodium chloride in the modifying agent being an amount effective to counteract the hygroscopic characteristics of the sodium carbonate.

3. A briquette that is useful for treating molten iron by addition thereto, comprising a major portion of silicon carbide and up to 15% by weight of the briquette of an alkaline modifying agent, the alkaline modifying agent comprising a mixture of sodium carbonate and sodium chloride with the amount of sodium chloride being sufficient to counter act the hygroscopic characteristics of the sodium carbonate.

References Cited in the file of this patent

UNITED STATES PATENTS

| | | |
|---|---|---|
| 581,942 | Saniter | May 4, 1897 |
| 796,459 | Seaboldt | Aug. 8, 1905 |
| 1,420,980 | Eichenberger | June 27, 1922 |
| 1,428,061 | Rouse | Sept. 5, 1922 |
| 2,119,521 | Brown | Oct. 10, 1935 |
| 2,496,074 | Vignos | Jan. 31, 1950 |
| 2,497,745 | Stohr | Feb. 14, 1950 |
| 2,540,173 | Olivo | Feb. 6, 1951 |
| 3,051,564 | Drenning | Aug. 28, 1962 |